US009063536B2

(12) United States Patent
Otsuki et al.

(10) Patent No.: US 9,063,536 B2
(45) Date of Patent: Jun. 23, 2015

(54) NUMERICAL CONTROLLER HAVING WORKPIECE MOUNTING ERROR COMPENSATION UNIT FOR THREE-AXIS MACHINE TOOL

(75) Inventors: Toshiaki Otsuki, Minamitsuru-gun (JP); Soichiro Ide, Minamitsuru-gun (JP); Osamu Hanaoka, Minamitsuru-gun (JP); Takafumi Sasaki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 832 days.

(21) Appl. No.: 13/243,466

(22) Filed: Sep. 23, 2011

(65) Prior Publication Data

US 2012/0187890 A1    Jul. 26, 2012

(30) Foreign Application Priority Data

Jan. 26, 2011   (JP) ................................. 2011-013978

(51) Int. Cl.
G05B 19/25 (2006.01)
G05B 19/408 (2006.01)

(52) U.S. Cl.
CPC .................................. G05B 19/4086 (2013.01)

(58) Field of Classification Search
USPC .................................. 318/560, 567, 569, 570
See application file for complete search history.

(56) References Cited

U.S. PATENT DOCUMENTS

| | | | |
|---|---|---|---|
| 5,661,654 A | 8/1997 | Nagashima | |
| 8,041,447 B2 * | 10/2011 | Otsuki et al. | 700/174 |
| 8,255,078 B2 * | 8/2012 | Otsuki et al. | 700/186 |
| 2006/0255759 A1 * | 11/2006 | Takeuchi et al. | 318/574 |
| 2009/0093905 A1 | 4/2009 | Otsuki et al. | |
| 2009/0140684 A1 * | 6/2009 | Otsuki et al. | 318/572 |
| 2011/0046773 A1 * | 2/2011 | Iwashita et al. | 700/182 |
| 2011/0238204 A1 * | 9/2011 | Ono et al. | 700/189 |

FOREIGN PATENT DOCUMENTS

| | | |
|---|---|---|
| JP | 3-48903 A | 3/1991 |
| JP | 6-312347 A | 11/1994 |
| JP | 7-299697 A | 11/1995 |
| JP | 2009-15464 A | 1/2009 |
| JP | 2009-93269 A | 4/2009 |

* cited by examiner

*Primary Examiner* — Kawing Chan
(74) *Attorney, Agent, or Firm* — Drinker Biddle & Reath LLP (57) ABSTRACT

A numerical controller controls a three-axis machine tool that machines a workpiece, mounted on a table, with at least three linear axes. The numerical controller includes a workpiece mounting error compensation unit that compensates a mounting error caused when the workpiece is mounted. The workpiece mounting error compensation unit performs an error compensation with respect to an instructed linear-axis position with amounting error which is set beforehand, in order to keep a position with respect to the workpiece at a tool center point position, based on the instructed linear-axis position of the three linear axes to obtain a compensated linear-axis position. The three linear axes are driven based on the obtained compensated linear-axis position.

1 Claim, 5 Drawing Sheets

NUMERICAL CONTROLLER HAVING WORKPIECE MOUNTING ERROR COMPENSATION UNIT FOR THREE-AXIS MACHINE TOOL

RELATED APPLICATION DATA

This application claims priority under 35 U.S.C. §119 and/or §365 to Japanese Application No. 2011-013978 filed Jan. 26, 2011, the entire contents of which is incorporated herein by reference.

BACKGROUND OF THE INVENTION

1. Field of the Invention

The present invention relates to a numerical controller that controls a three-axis machine tool, which machines a workpiece (an object to be machined) mounted on a table with at least three linear axes, and more particularly, to a numerical controller having a workpiece mounting error compensation unit for a three-axis machine tool that compensates a mounting error caused when a workpiece is mounted.

2. Description of the Related Art

A jig for fixing a workpiece on a table is used in order to facilitate a machining with a use of a machine tool. In this case, a workpiece mounting error (offset) is caused with respect to the machine tool because of the usage of the jig or the tilt of the table. The mounting error described above has to be compensated.

For example, Japanese patent documents described below describe techniques for compensating a mounting error of the workpiece with respect to the table when the workpiece mounted on the table is machined.

Japanese Patent Application Laid-Open No. 7-299697 describes the afore-mentioned technique of compensating the mounting error. This technique relates to a compensation method of a mounting error of a workpiece in a numerical controller that performs a simultaneous five-axis control of a tool with respect to a workpiece mounted on a jig. In this method, the position and direction of the tool in a coordinate system of the workpiece are determined based on a numerical instruction. An error compensation of an amount set beforehand is made with respect to the respective positions and directions, and coordinate values of five axes satisfying the position and direction of the tool, which are obtained as a result of the error compensation, are obtained. And, based on the obtained coordinate value of five axes, an instruction of a numerical control is issued to a drive unit of each axis.

Japanese Patent Application Laid-Open No. 2009-15464 describes a numerical controller that performs an interpolation with the coordinate values before execution of error compensation so as to attain a machining result similar to the result to be attained if there is no error, when there is an error between a position of a workpiece assumed by a machining program and an actual position of the workpiece and the workpiece rotates during the machining, and then performs an error compensation for the positions obtained by execution of interpolation for every interpolation point.

Japanese Patent Application Laid-Open No. 2009-93269 discloses a numerical controller that controls a five-axis machine tool which machines a workpiece mounted on a table with three linear axes and two rotary axes, and more particularly discloses a numerical controller which comprises a workpiece mounting error compensation unit for compensating a mounting error caused when the workpiece is mounted.

The techniques described in the above-mentioned three patent documents are applied to a numerical controller controlling a five-axis machine tool that has linear axes and rotary axes and that can control a direction of a tool to the workpiece. Specifically, these techniques aim to retain the position and direction of a tool with respect to a workpiece based on an original instruction by compensating the position and direction of the tool with respect to the workpiece in order to compensate the mounting error of the workpiece.

Figure 1:
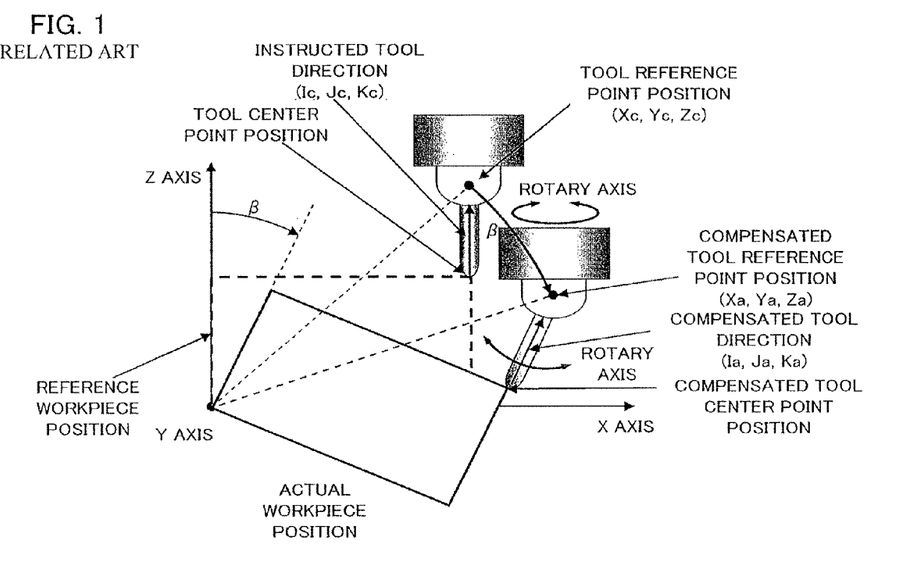
FIG. 1 is a view for explaining a compensation of a mounting error of a workpiece in a five-axis machine tool.
Figure 2:
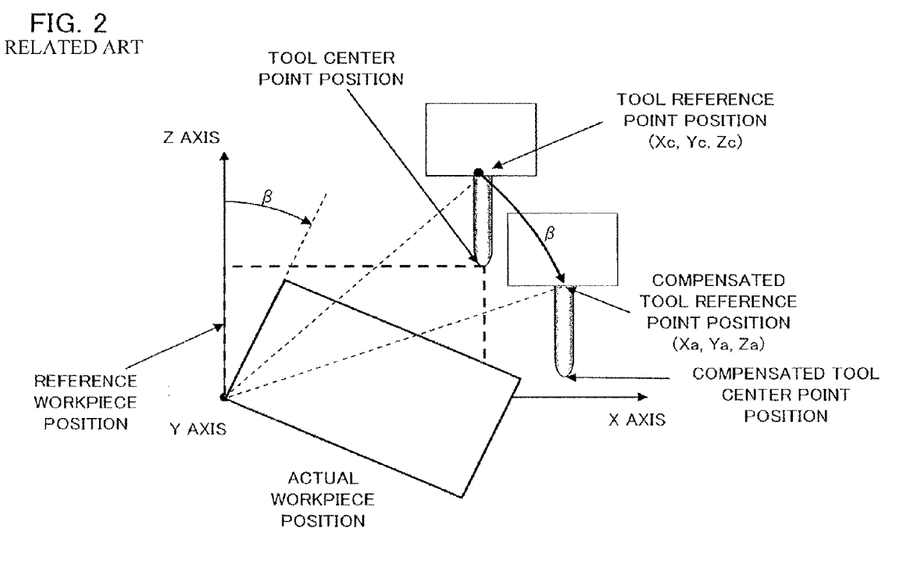
FIG. 2 is a view for explaining a conventional compensation of a mounting error of a workpiece in a three-axis machine tool.

On the other hand, in a three-axis machine tool having at least three linear axes, a direction of a tool cannot be compensated, but it is desirable to compensate a position of a tool center point that is a machining point. In this case, the methods described in the above-mentioned patent documents, which are applicable to a five-axis machine tool that can control a direction of a tool, are compensation methods assumed to allow the direction of the tool to be compensated, as shown in FIGS. 1 and 2 that represent the related art of numerical control. Therefore, these methods cannot be applied to a three-axis machine tool.

In the patent documents described above that are applied to a five-axis machine tool, when there is a rotation error ($\beta$) about an Y axis at a position of a workpiece as illustrated in FIG. 1, for example, a compensation for the rotation error ($\beta$) with respect to a tool reference point position $(Xc, Yc, Zc)^T$ and an instructed tool direction $(Ic, Jc, Kc)^T$ are calculated as in an equation (1) described below, whereby a compensated tool reference point position $(Xa, Ya, Za)^T$ and a compensated tool direction $(Ia, Ja, Ka)^T$ are obtained. Then, a compensated rotary axis position is obtained as a rotary axis position (position of A, B, or C axis) for realizing the obtained compensated tool direction $(Ia, Ja, Ka)^T$. The X, Y, and Z axes are driven to the compensated tool reference point position $(Xa, Ya, Za)^T$, while the rotary axis (A, B, or C axis) is driven to the compensated rotary axis position, whereby the position (compensated reference point position) and the direction of the tool with respect to an actual workpiece position are compensated. Accordingly, the position and direction of the tool with respect to the workpiece based on the original instruction are retained. "$^T$" described herein represents transposition. However, "$^T$" will not be particularly described when the transposition is obvious.

$$\begin{bmatrix} Xa \\ Ya \\ Za \end{bmatrix} = \begin{bmatrix} \cos\beta & 0 & \sin\beta \\ 0 & 1 & 0 \\ -\sin\beta & 0 & \cos\beta \end{bmatrix} \begin{bmatrix} Xc \\ Yc \\ Zc \end{bmatrix} \quad (1)$$

$$\begin{bmatrix} Ia \\ Ja \\ Ka \end{bmatrix} = \begin{bmatrix} \cos\beta & 0 & \sin\beta \\ 0 & 1 & 0 \\ -\sin\beta & 0 & \cos\beta \end{bmatrix} \begin{bmatrix} Ic \\ Jc \\ Kc \end{bmatrix}$$

The matrix at the right side is only a matrix relating to $\beta$ in a product of matrices of a rotation error ($\alpha$) about an X axis, a rotation error ($\beta$) about a Y axis, and a rotation error ($\gamma$) about a Z axis in an equation (2) described below. In FIGS. 1 and 2, the case in which the workpiece is located at the actual position due to the rotation error ($\beta$) about the Y axis with respect to the reference workpiece position where respective sides of a rectangular-solid workpiece are parallel to the X, Y, and Z axes is indicated by a X-Z plane. $\beta$ is actually a small value, but it is exaggeratingly illustrated in the figures.

$$\begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix} \quad (2)$$

However, since the three-axis machine tool has no rotary axis, the direction of the tool cannot be compensated. Specifically, the calculation of (Ia, Ja, Ka) in the equation (1) is not carried out. As a result, the relationship between the actual workpiece position and the compensated tool center point position is different from the relationship between the reference workpiece position and the tool center point position as illustrated in FIG. 2. This is because the numerical controller controls the tool reference point position in FIG. 2 as drive positions of three linear axes. Specifically, when the calculation of the equation (1) is made for the rotation error (β) with respect to the tool reference point position (Xc, Yc, Zc) so as to obtain the compensated tool reference point position (Xa, Ya, Za), the corresponding compensated tool center point position does not become a correct position with respect to the actual workpiece position. This is because the relationship between the actual workpiece position and the compensated tool center point position could not be the same as the relationship between the reference workpiece position and the tool center point position only by the calculation for the tool reference point position (Xc, Yc, Zc).

Japanese Patent Application Laid-Open No. 2009-15464, mentioned above, describes "in a three-axis machine tool having no rotary axis, a rotation angle of a workpiece is not changed during machining of the workpiece, so that the mounting error is not changed by the rotation. Therefore, the mounting error can be compensated by setting a workpiece offset or by using a three-dimensional coordinate conversion function" (see paragraph number [0003]). This suggests that a translational error can be compensated by setting a workpiece offset, but a rotation error cannot accurately be compensated by the three-dimensional coordinate conversion function. This is because the matrix calculation in the equation (2) or (1) is three-dimensional coordinate conversion, and precise compensation could not be attained, as described above, even if these calculations are applied to the three-axis machine tool.

Therefore, in the case of three-axis machine tool, a correct machining at a compensated tool center point position could not be made by the conventional technique such as the method of applying the compensation of the mounting error of the workpiece in the five-axis machine tool to the three-axis machine tool, or the method of using the three-dimensional coordinate conversion function as described in Japanese Patent Application Laid-Open No. 2009-15464, mentioned above.

SUMMARY OF THE INVENTION

An object of the present invention is to provide a numerical controller that precisely compensates a tool center point position, which is a machining point, when there is a mounting error of a workpiece in a three-axis machine tool having at least three linear axes.

The numerical controller according to the present invention controls a three-axis machine tool that machines a workpiece, mounted on a table, with at least three linear axes. The numerical controller includes a workpiece mounting error compensation unit that compensates amounting error caused when the workpiece is mounted. The workpiece mounting error compensation unit includes an error compensation unit that performs an error compensation with respect to an instructed linear-axis position with a mounting error which is set beforehand, in order to keep a position with respect to the workpiece at a tool center point position, based on the instructed linear-axis position of the three linear axes to obtain a compensated linear-axis position, wherein the three linear axes are driven based on the compensated linear-axis position obtained by the error compensation unit in the workpiece mounting error compensation unit.

The mounting error may be set as translational errors in X, Y, and Z axis directions, a rotation error about the X axis, a rotation error about the Y axis, or a rotation error about a Z axis.

The instructed linear-axis position may be set as a tool reference point position of the three linear axes instructed in a program instruction.

The instructed linear-axis position may be set as a tool reference point position of the three linear axes, which is obtained by interpolating the program instruction.

The instructed linear-axis position may be set as an instructed tool reference point position obtained by adding a tool-length compensation vector to the instructed tool center point position of the three linear axes instructed in the program instruction.

The instructed linear-axis position may be set as the tool reference point position of the three linear axes obtained by interpolating the instructed tool reference point position, which is obtained by adding the tool-length compensation vector to the instructed tool center point position of the three linear axes instructed in the program instruction.

The present invention can provide a numerical controller that can precisely compensate a tool center point position, which is a machining point, when there is a mounting error of a workpiece in a three-axis machine tool having at least three linear axes. According to the present invention, the tool center point position that is the machining point can be made correct with respect to the workpiece, although the direction of the tool cannot be compensated. Therefore, the machining at a tool center point can precisely be carried out.

BRIEF DESCRIPTION OF THE DRAWINGS

The aforementioned and other objects and features of the present invention will be apparent from the following description of embodiments with reference to the accompanying drawings in which.

DETAILED DESCRIPTION OF THE PREFERRED EMBODIMENTS

Firstly, a compensation of a mounting error of a workpiece in a three-axis machine tool will be described with reference to FIG. 3.

In the three-axis machine tool, a tool moves according to operations of linear axes X, Y, and Z. Due to a deviation upon mounting the workpiece, or a tilt of a table, the actual workpiece position is shifted from the original workpiece position. Therefore, an actual machine coordinate system is created with respect to a reference machine coordinate system in such a manner that a reference workpiece position on the reference machine coordinate system becomes equal to the actual workpiece position on the actual machine coordinate system.

A shift amount of the actual machine coordinate system from the reference machine coordinate system is measured beforehand as a mounting error. The mounting error is set as translational errors ($\delta x$, $\delta y$, $\delta z$) in the X, Y, and Z axis directions, a rotation error ($\alpha$) about the X axis, a rotation error ($\beta$) about the Y axis, and a rotation error ($\gamma$) about the Z axis with respect to the reference machine coordinate system. The rotation errors are compensated in the order of ($\alpha$), ($\beta$), and ($\gamma$). All of these mounting errors are not necessarily set, but some of them may be set. Although $\delta x$, $\delta y$, $\delta z$, $\alpha$, $\beta$ and $\gamma$ are small values, they are exaggeratingly illustrated in the figures. It is supposed here that the translational error and the rotation error are present with respect to the reference machine coordinate system. However, it may be supposed that those errors are present with respect to another coordinate system, for example, a workpiece coordinate system.

Figure 3:
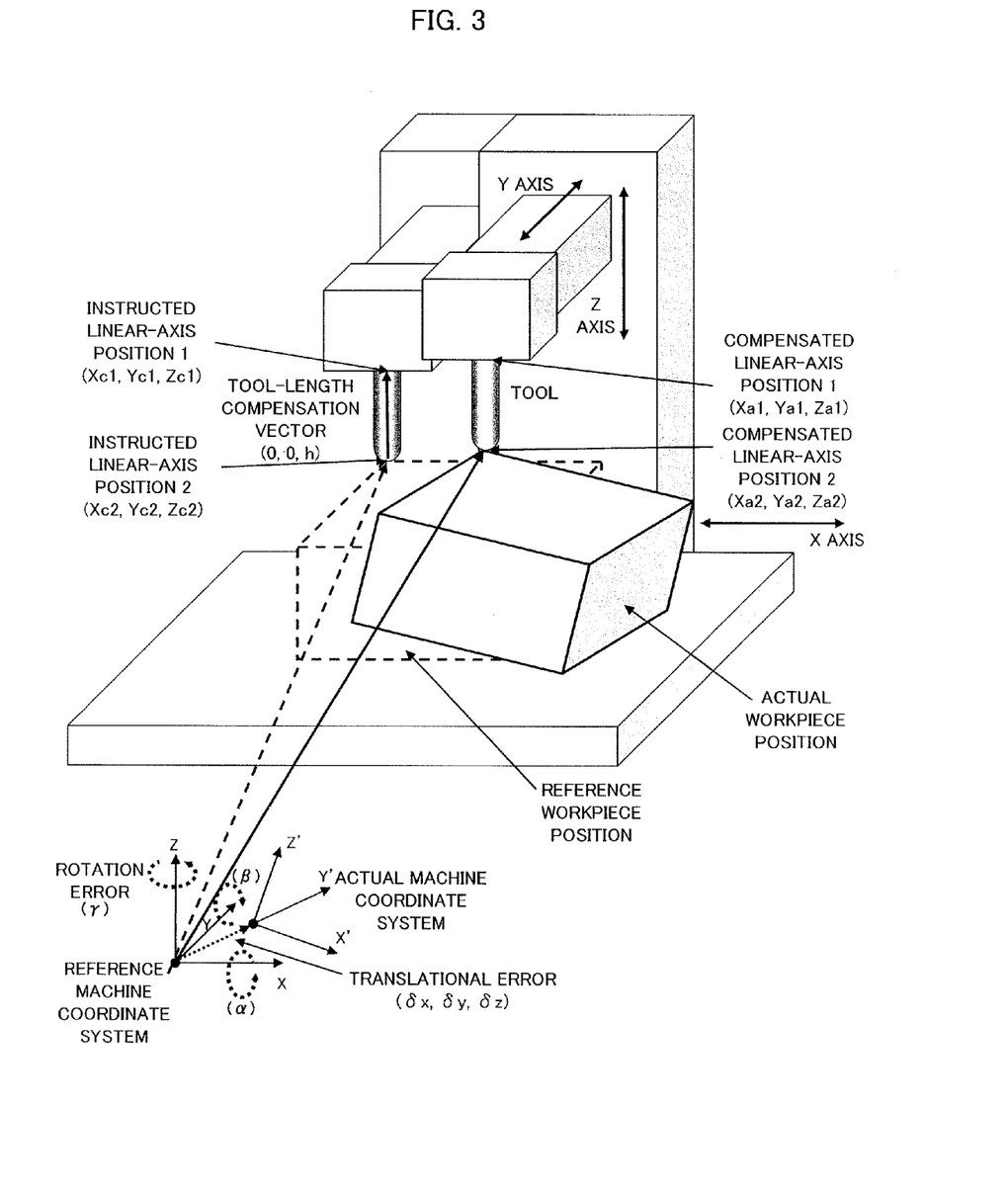
FIG. 3 is a view for explaining a compensation of a mounting error of a workpiece in a three-axis machine tool controlled by a numerical controller according to the present invention.

In FIG. 3, the program instruction is issued with the reference machine coordinate system, wherein the instruction of the tool reference point position is indicated by an instructed linear-axis position 1 (Xc1, Yc1, Zc1), while the instruction of the tool center point position is indicated by an instructed linear-axis position 2 (Xc2, Yc2, Zc2). For the convenience of illustration, only the instructed linear-axis position 2 (Xc2, Yc2, Zc2) is illustrated as a positional vector from an origin of the reference machine coordinate system, and only the position of the instructed linear-axis position 1 (Xc1, Yc1, Zc1) is illustrated without a vector in the figure. In general, the tool reference point position is a position where a tool-length compensation vector is added to the tool center point position. The tool center point position may be a position of an apex of the tool, or a center of a semisphere at a tip in case where the tool is a ball-end mill.

The tool-length compensation vector is a vector in the Z axis direction, and it is indicated as (0, 0, h). The amount of h may be given through the designation of a compensation number in the program, or may be set by a unit for setting parameters or the like. In this example, the direction of the tool-length compensation vector is specified as the Z axis direction. However, the direction may be of any other axes, or the direction may be tilted.

First Embodiment

When the tool reference point position is instructed, a calculation in an equation (3) is carried out with respect to the instructed linear-axis position 1 (Xc1, Yc1, Zc1), whereby a compensated linear-axis position 1 (Xa1, Ya1, Za1) is obtained. It is an error compensation unit in the workpiece mounting error compensation unit that carries out this calculation. The instructed linear-axis position 1 is the instructed linear-axis position. The compensated linear-axis position 1 is a compensated linear-axis position. The position where the X, Y, and Z axes actually move is the compensated linear-axis position 1 (Xa1, Ya1, Za1). The three linear axes are driven to this position (see FIG. 5). With this, even when the tool reference point position is instructed, the compensated tool center point position that is the machining point (the compensated linear-axis position 2 (Xa2, Ya2, Za2) in FIG. 3) becomes a correct position with respect to the actual workpiece position. Therefore, the machining at the tool center point can precisely be performed, even if there is a mounting error of the workpiece.

$$\begin{bmatrix} Xa1 \\ Ya1 \\ Za1 \end{bmatrix} = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \quad (3)$$

$$\begin{bmatrix} 1 & 0 & 0 \\ 0 & \cos\alpha & -\sin\alpha \\ 0 & \sin\alpha & \cos\alpha \end{bmatrix} \left( \begin{bmatrix} Xc1 \\ Yc1 \\ Zc1 \end{bmatrix} - \begin{bmatrix} 0 \\ 0 \\ h \end{bmatrix} \right) + \begin{bmatrix} \delta x \\ \delta y \\ \delta z \end{bmatrix} + \begin{bmatrix} 0 \\ 0 \\ h \end{bmatrix}$$

The compensated tool center point position (compensated linear-axis position 2 (Xa2, Ya2, Za2)) is expressed by an equation (4) described below.

$$\begin{bmatrix} Xa2 \\ Ya2 \\ Za2 \end{bmatrix} = \begin{bmatrix} Xa1 \\ Ya1 \\ Za1 \end{bmatrix} - \begin{bmatrix} 0 \\ 0 \\ h \end{bmatrix} \quad (4)$$

Figure 4:
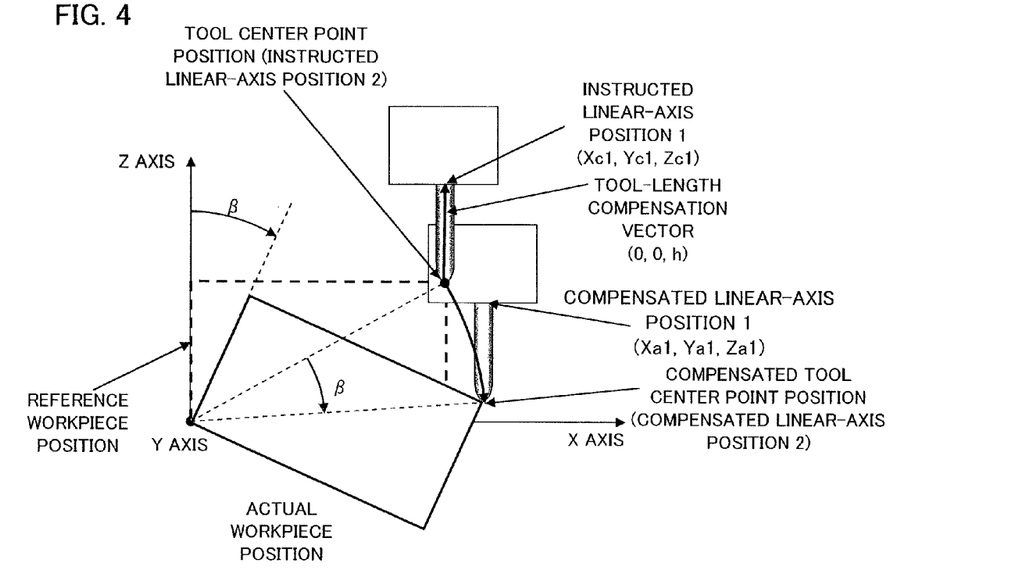
FIG. 4 is a view for explaining that a machining can correctly be made at a compensated tool center point position by using the numerical controller according to the present invention, even if there is a mounting error of the workpiece.

As a result, FIG. 2 that is described as the conventional technique is changed to FIG. 4. Accordingly, even if there is a mounting error of the workpiece, the machining at the compensated tool center point can precisely be performed. Specifically, the calculation is carried out, not for the tool reference point position, but for the tool center point position obtained by subtracting the tool-length compensation vector from the instructed linear-axis position, as in the equation (3) ((Xc1, Yc1, Zc1)−(0, 0, h)), whereby the relationship between the actual workpiece position and the compensated tool center point position becomes equal to the relationship between the reference workpiece position and the tool center point position. Therefore, the machining at the tool center point can precisely be performed, even if there is a mounting error of the workpiece.

So far, the instructed linear-axis position 1 has been described as the position instructed by the program. However, there may be the case in which the instructed linear-axis position 1 may be set as the position of X, Y, and Z axes obtained by performing the interpolation to the program instruction for every interpolation cycle, and the workpiece mounting error compensation may be executed to the instructed linear-axis position 1 that is the interpolated position of X, Y, and Z axes (see FIG. 6).

Second Embodiment

In case where the tool center point position is instructed as the instructed linear-axis position 2 (Xc2, Yc2, Zc2), the tool-length compensation vector (0, 0, h) is added to the instructed linear-axis position 2 (Xc2, Yc2, Zc2) to obtain the instructed tool reference point position, and the instructed tool reference point position thus obtained is specified as the instructed linear-axis position 1 (Xc1, Yc1, Zc1). The calculation in the equation (3) is carried out for the instructed linear-axis position 1 (Xc1, Yc1, Zc1) as in the above-mentioned first embodiment, whereby the compensated linear-axis position 1 (Xa1, Ya1, Za1) is obtained. It is an error compensation unit in the workpiece mounting error compensation unit that carries out this calculation. The instructed linear-axis position 1 is the instructed linear-axis position. The compensated linear-axis position 1 is a compensated linear-axis position. The position where the X, Y, and Z axes actually move is the compensated linear-axis position 1 (Xa1, Ya1, Za1). The three linear axes are driven to this position (see FIG. 5). With this, the compensated tool center point position that is the machining point (the compensated linear-axis position 2 in FIG. 3) becomes a correct position with respect to the actual workpiece position as in the case of the first embodiment. Therefore, the machining at the tool center point can precisely be performed, even if there is a mounting error of the workpiece.

So far, the instructed linear-axis position 1 has been described as the instructed tool reference point position obtained by adding the tool-length compensation vector (0, 0, h) to the instructed tool center point position (instructed linear-axis position 2 (Xc2, Yc2, Zc2)) of the three linear axes that are the X, Y, and Z axes instructed by the program. Alternatively, the instructed tool reference point position, which is obtained by adding the tool-length compensation vector (0, 0, h) to the instructed tool center point position (instructed linear-axis position 2 (Xc2, Yc2, Zc2)) instructed by the program, may be interpolated for every interpolation cycle, and the tool reference point position of the X, Y, and Z axes obtained through the interpolation may be specified as the instructed linear-axis position 1 of the three linear axes, and then the workpiece mounting error compensation may be executed to this instructed linear-axis position 1. In this case, a program instruction analyzing unit adds the tool-length compensation vector (0, 0, h) to the instructed tool center point position (instructed linear-axis position 2 (Xc2, Yc2, Zc2)) instructed by the program. Specifically, an interpolation unit interpolates the instructed tool reference point position created by the program instruction analyzing unit so as to create the instructed linear-axis position 1, and the workpiece mounting error compensation is executed with respect to the instructed linear-axis position 1 (see FIG. 6).

The three-axis machine tool illustrated in FIG. 3 is a machining tool in which a tool moves by the operation of linear axes, X, Y, and Z axes. However, another three-axis machine tool in which a tool or a table moves by the operation of linear axes, X, Y, and Z axes, can be employed. The calculations described above can similarly be applied to another type of the three-axis machine tool.

The three-axis machine tool having only the X, Y, and Z axes is employed in the embodiment. However, a machine tool can be employed, which has U, V, and W axes that are parallel axes of the X, Y, and Z axes, an auxiliary axis for ATC (automatic tool changer), or another additional axes. The numerical controller according to the present invention controls the three-axis machine tool that machines a workpiece mounted on a table with at least three linear axes. At least "three linear axes" which the three-axis machine tool comprises means the three linear axes of X, Y, and Z, and further means that the three-axis machine tool may have U, V, and W axes, an auxiliary axis, and another additional axes, according to need, in addition to the three linear axes.

Figure 5:
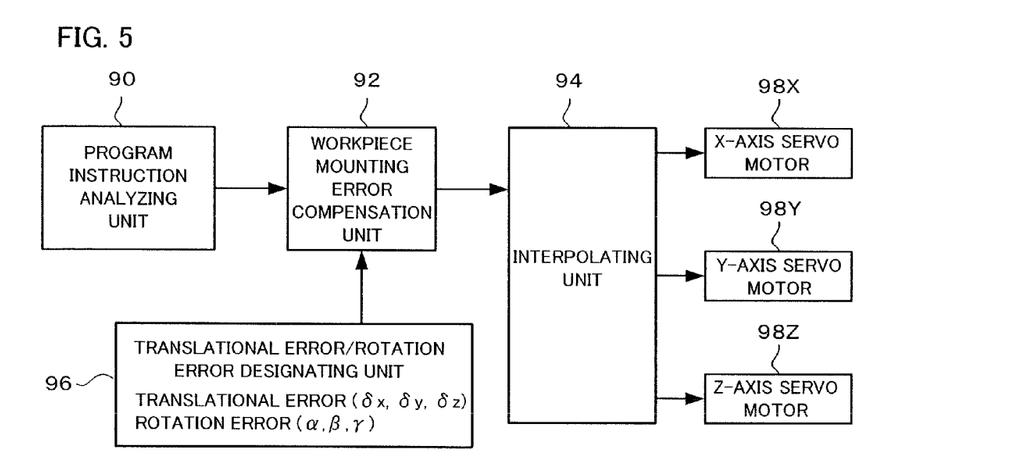
FIG. 5 is a functional block diagram illustrating a numerical controller, according to one embodiment of the present invention, which performs a workpiece mounting-error compensation with respect to a program instruction.

FIG. 5 is a functional block diagram illustrating a numerical controller, according to one embodiment of the present invention, which performs a workpiece mounting error compensation with respect to a program instruction.

At a workpiece mounting error compensation unit 92, the workpiece mounting error compensation is performed for the program instruction that is analyzed at a program instruction analyzing unit 90 based on a translational error/rotation error from a translational error/rotation error designating unit 96. The program instruction that has been subjected to the workpiece mounting error compensation is interpolated at an interpolating unit 94. Interpolation data obtained through the interpolation is used for a drive control of an X-axis servo motor 98X, Y-axis servomotor 98Y, and Z-axis servo motor 98Z.

Figure 6:
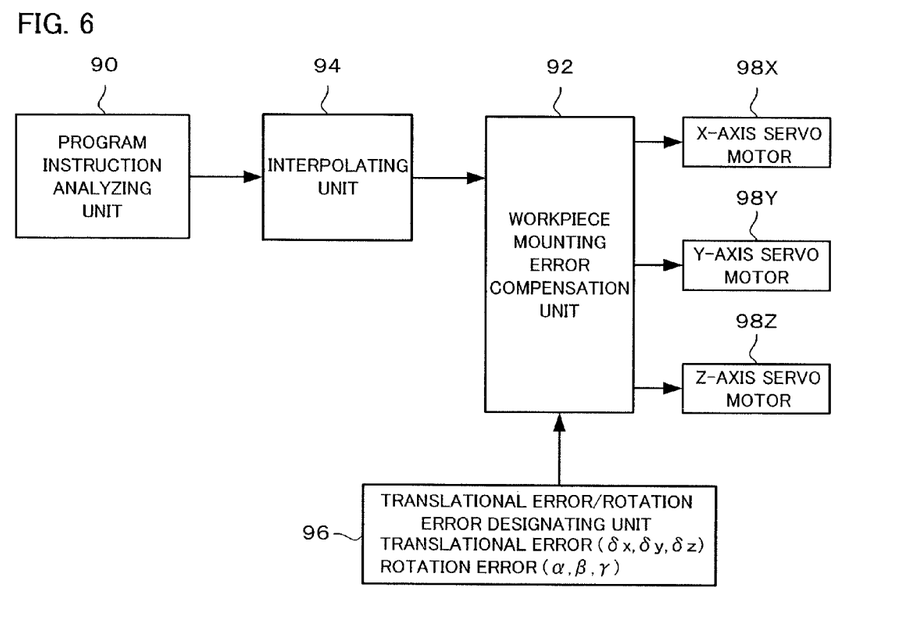
FIG. 6 is a functional block diagram illustrating a numerical controller, according to one embodiment of the present invention, which performs a workpiece mounting error compensation with respect to an interpolated position.

FIG. 6 is a functional block diagram illustrating a numerical controller, according to one embodiment of the present invention, which performs a workpiece mounting error compensation with respect to an interpolated position.

In this embodiment, the program instruction analyzed at the program instruction analyzing unit 90 is interpolated at the interpolating unit 94. The workpiece mounting error compensation is performed, at the workpiece mounting error compensation unit 92, with respect to the interpolation data obtained through the interpolation. The interpolation data that has been subjected to the workpiece mounting error compensation is used for drive control of the X-axis servomotor 98X, Y-axis servo motor 98Y, and Z-axis servo motor 98Z.

Figure 7:
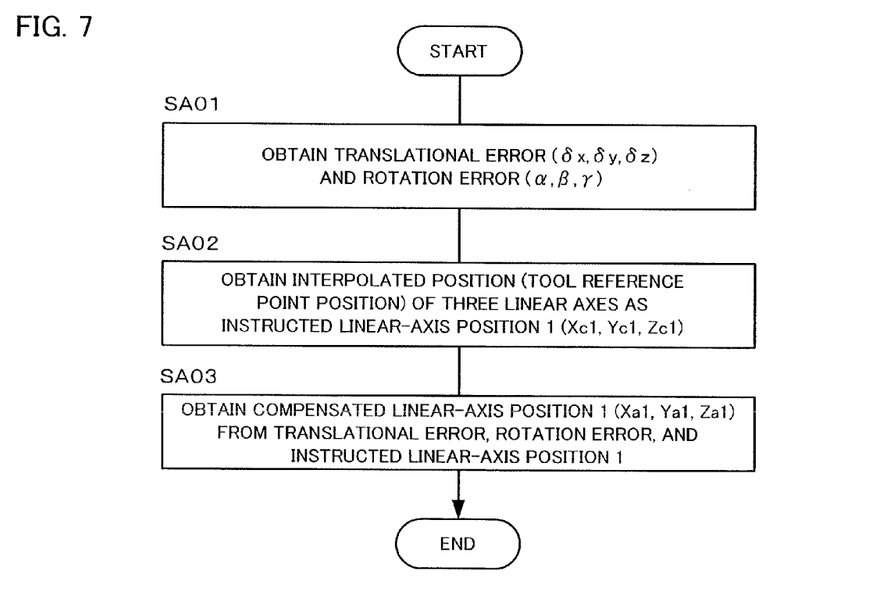
FIG. 7 is a flowchart for explaining an operation of a workpiece mounting error compensation unit in a second embodiment when the workpiece mounting error compensation is made for the interpolated position as illustrated in FIG. 6.

FIG. 7 is a flowchart for explaining an operation of the workpiece mounting error compensation unit 92 in the second embodiment in case where the workpiece mounting error compensation is carried out for the interpolated position as illustrated in FIG. 6. The process will be described for respective steps as follows. During the process, steps SA02 and SA03 correspond to the error compensation unit.

[Step SA01] Translational error (δx, δy, δz) and rotation error (α, β, γ) are obtained.

[Step SA02] The interpolated position (tool reference point position) of the three linear axes is obtained as the instructed linear-axis position 1 (Xc1, Yc1, Zc1).

[Step SA03] The compensated linear-axis position 1 (Xa1, Ya1, Za1) is obtained from the translational error (δx, δy, δz), the rotation error (α, β, γ) and the instructed linear-axis position 1 (Xc1, Yc1, Zc1) with the use of the equation (3).

Figure 8:
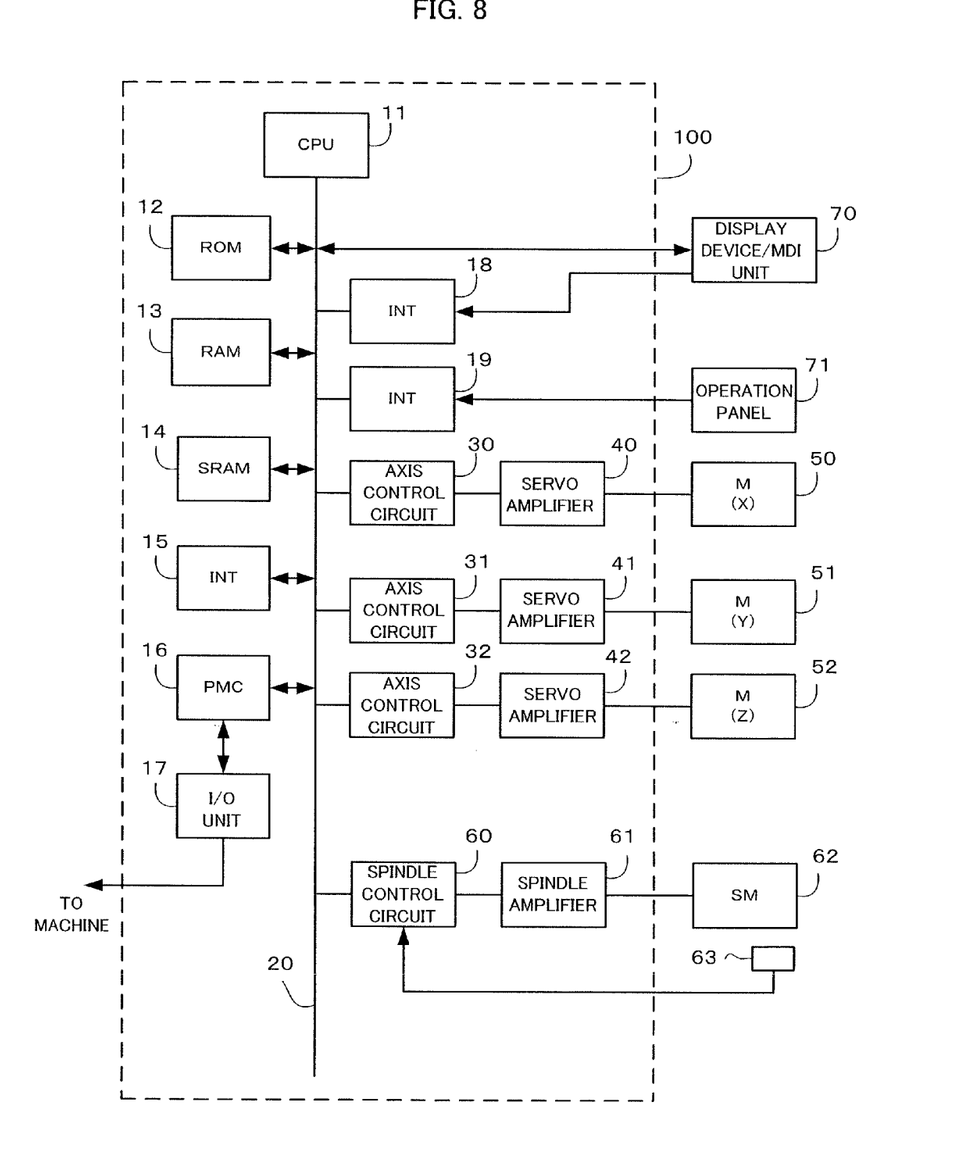
FIG. 8 is a block diagram illustrating an essential part of a computerized numerical controller (CNC) according to one embodiment of the present invention.

FIG. 8 is a block diagram illustrating an essential part of a computerized numerical controller (CNC) according to one embodiment of the present invention.

A CPU 11 that is a processor for entirely controlling a numerical controller 100 reads a system program stored in a ROM 12 through a bus 20, and entirely controls the numerical controller in accordance with the read system program. A RAM 13 stores temporal calculation data or display data, and various data input by an operator through a display device/MDI (manual data input) unit 70. A SRAM memory 14 is configured as a non-volatile memory that retains a storage state, even if a power supply of the numerical controller 100 is turned off. The SRAM memory 14 stores a machining program read through an interface 15, or a machining program input through the display device/MDI unit 70. In the ROM 12, various system programs for executing a process of an edition mode required for creating and editing the machining program and a process for an automatic operation are loaded beforehand.

Axis control circuits 30 to 32 of the respective axes output instructions for the respective axes to servo amplifiers 40 to 42 on receipt of a moving instruction of the respective axes from the CPU 11. The servo amplifiers 40 to 42 drive the servo motors 50 to 52 of the respective axes on receipt of the instruction. Each of the servomotors 50 to 52 of the respective axes has incorporated therein a position/speed detector, and feeds back a position/speed feedback signal from the position/speed detector to each of axis control circuits 30 to 32 so as to perform a position/speed feedback control. The position/speed feedback is not illustrated in FIG. 8.

The servo motors 50 to 52 drive the X, Y, and Z axes of the machining tool. A spindle control circuit 60 receives a spindle rotation instruction, and outputs a spindle speed signal to a spindle amplifier 61. The spindle amplifier 61 receives the spindle speed signal, and feeds back the spindle speed signal to the spindle control circuit 60 so as to drive a spindle motor (SM) 62 with the instructed rotation speed to thereby perform a speed control.

The configuration of the numerical controller 100 described above is substantially the same as the configuration of a conventional numerical controller, and the numerical controller 100 controls to drive the three-axis machine tool. The processor (CPU) 100 of the numerical controller 100 executes software having an algorithm for compensating the mounting error caused when the workpiece is mounted.

The invention claimed is:

1. A numerical controller controlling a three-axis machine tool that machines a workpiece mounted on a table with at least three linear X, Y, and Z axes, the numerical controller comprising:
    a workpiece mounting error compensation unit configured to compensate a mounting error caused when a workpiece is mounted,
    wherein the workpiece mounting error compensation unit has an error compensation unit that performs an error compensation with respect to an instructed linear-axis position with a tool-length compensation vector and the mounting error which is measured and set in beforehand as translation errors in directions along the X, Y, and Z axes, and rotation errors around the X, Y, and Z axes, the mounting error being a difference between a reference workpiece position and an actual workpiece position of the workpiece, when the workpiece is mounted in order to keep a position with respect to the workpiece at a tool center point position, based on the instructed linear-axis position of the three linear axes to obtain a compensated linear-axis position,
    wherein the instructed linear-axis position is a tool reference point position of the three linear axes obtained by interpolating an instructed tool reference point position, the instructed tool reference point position obtained by adding the tool-length compensation vector to the tool center point position of the three linear axes instructed in a program instruction,
    the workpiece mounting error compensation unit is configured to perform the error compensation by subtracting the tool-length compensation vector from the instructed linear-axis position, performing the error compensation based on the rotation error, performing the error compensation based on the translation error, and adding the tool-length compensation vector, and
    the three linear axes are driven based on the compensated linear-axis position obtained by the error compensation unit in the workpiece mounting error compensation unit.

* * * * *